Aug. 9, 1938.  E. S. COOK  2,125,887
PRESSURE INDICATOR FOR CLOTHES WRINGERS
Filed May 6, 1937
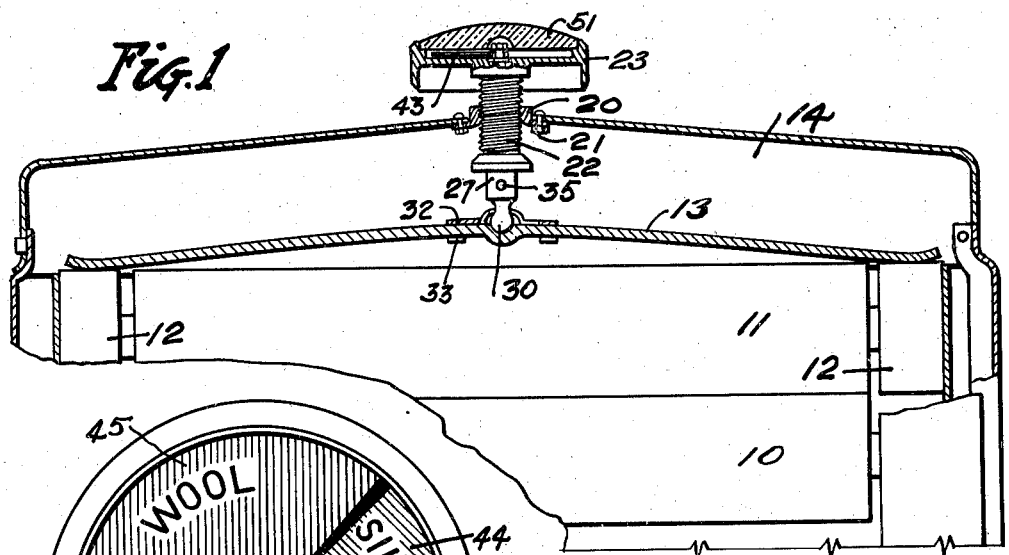
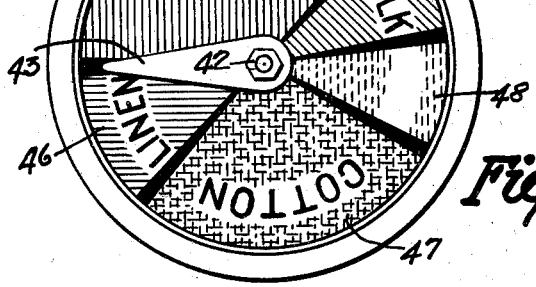
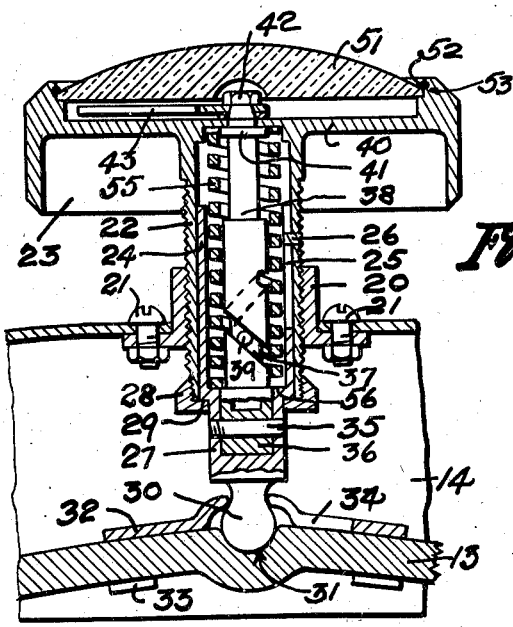
INVENTOR
EDWIN S. COOK
by J. H. Weatherford
Atty.

Patented Aug. 9, 1938

2,125,887

UNITED STATES PATENT OFFICE 2,125,887

PRESSURE INDICATOR FOR CLOTHES WRINGERS

Edwin S. Cook, Memphis, Tenn.

Application May 6, 1937, Serial No. 141,054

10 Claims. (Cl. 68—262)

This invention relates to a device for varying the pressure exerted to hold together the rollers of a clothes wringer, and more particularly to means for indicating the pressure adjustments which are suitable for particular kinds of material which are to be passed through the wringers.

In clothes wringers the wet clothes are passed between two rubber rollers, which squeeze the moisture from the clothes. One of these rollers, ordinarily the upper, is mounted in movable bearings, and these bearings are held down by a spring or springs, the tension being varied from time to time by manual adjustment, usually because of the material of which the goods is made, and the amount of pressure it is necessary to exert on a particular material to remove the moisture, cotton materials requiring the greatest pressure, and linen, wool and silk successively lower pressures.

The objects of the present invention are to provide means for adjusting the spring pressure exerted and means in connection therewith to relatively show the extent of the adjustment and the material for which a particular adjustment is most suitable.

The means by which the foregoing and other objects are accomplished and the method of their accomplishment will readily be understood from the following specification, on reference to the accompanying drawing, in which—

Fig. 1 is a fragmentary sectional elevation showing a portion of the rollers and bearings, the spring for exerting pressure, and the screw through which the pressure is applied to the spring.

Fig. 2 is a sectional elevation on a larger scale, taken on the vertical center line, showing this screw and the complementary parts through which pressure is adjusted, and the supplementary parts through which pressure indications are accomplished.

Fig. 3 is a corresponding plan view.

Referring now to the drawing, in which the various parts are indicated by numerals, 10 and 11 are rubber covered rollers through which the wringing is accomplished. The roller 11 is journaled at its opposite ends in a pair of vertically slidable bearings 12, against which the outer ends of a leaf spring 13 bear. 14 is an arch member forming part of the wringer frame, from which pressure is transferred to the spring 13.

In the present device 20 is a nut substantially at the center point of the arch member 14, which forms part of or is secured to the arch member, either permanently or by screws 21. 22 is a hollow screw threadedly engaging the nut 20, this screw having at its upper end a cylindrical hand wheel 23, to which it is here shown as integrally attached. Slidably disposed within the screw 22 is a hollow sleeve 24, which sleeve is provided with a longitudinal slot 25, into which slot a pin 26 carried by the screw 22 projects, the pin 26 being slidable in the slot 25, and preventing relative rotation of the screw and sleeve. A lower portion or extension 27 of the sleeve is of reduced diameter, both internally and externally, and projects below the end of the hollow screw 22. 28 is an annular nut surrounding this reduced extension and threadedly engaging the lower end of the screw 22, this nut underlying the shoulder 29 formed between the reduced extension 27 and the body of the sleeve 24, and serving to prevent dislodgement of the sleeve from the screw. 30 is a ball formed on the extreme lower end of the extension 27, this ball seating in a socket 31 in the spring 13, and being held against displacement from this socket by a clip 32, which preferably has ears 33 underlying the spring to secure it in place, and may be provided with a slot 34, this clip in such case being displaceable along the spring to permit disengagement of the ball from the socket.

Secured within the extension 27, as by a pin 35, is a hollow post 36, in which post is formed a spiral slot 37, which slot makes one complete helical turn. Slidably disposed within the post 36 is a stem 38, from which stem a pin 39 extends laterally into sliding engagement with the slot 37. The upper end of the stem 38 projects through a central opening in the web portion 40 of the hand wheel 23, there being a collar 41 on the stem underlying the web. Secured to the stem 38 above the web 40, as by a nut 42, is a pointer 43, which by the manner of its securement is constrained to turn with the stem, but which may be adjusted to any desired position before tightening the nut.

The upper surface of the web 40 serves as a dial to cooperate with the pointer 43. The dial is divided by radial lines into a number of sectors, which sectors may be colored to emphasize them and which sectors additionally also may bear the names of various classes of goods. In the present instance one of these sectors 44, which indicates the lightest pressure, has been marked with the word "Silk" and has been lined to indicate the color green. The adjacent sector 45 is marked with the word "Wool" and has been vertically lined to indicate the color red. The sector 46 has been marked with the word "Linen" and longitudinally lined to indicate the color blue. The sector 47 has been lined to indicate the color yellow and marked "Cotton", and the sector 48 has been lined to indicate the color purple and is unmarked.

The sector members, in progressive order of increase, indicate progressive increase of pressure from a minimum at the beginning of the sector 44, or "Silk" sector, to and through the sector 47, or "Cotton" sector.

51 is a glass cover which may be secured in place in the hand wheel above the pointer 43, as by a spring wire 52 engaging an annular interior groove 53 in the wheel. 55 is a compression spring interposed between the hand wheel 23 and the sleeve 24, the spring being disposed within the sleeve, at one end abutting the annular shoulder 56 at the junction of the sleeve and its extension 27, and at the other end the underside of the web 40 within the hollow screw 22.

In setting the device initially the hand wheel 23 is tightened or loosened as may be necessary to give the pressure proper for silk, this being the most delicate ordinarily handled by the wringer and requiring the least pressure. With the hand wheel so set, the nut 42 is loosened and the pointer 43 shifted to the division line between silk and the unnamed sector 48 and the nut tightened to clamp the pointer in place. Thereafter the cover 51 is secured in place, as by the spring 52, and the device is ready for use.

In using the device, if silk fabric is to be passed through the wringer, the hand wheel as above adjusted has its proper setting. If, however, wool, linen, or cotton fabric is to be put through the wringer, the hand wheel is turned clock-wise to further compress the spring 55 and put more pressure on the rollers 10 and 11. As the spring is compressed the sleeve 24 moves upward relatively to the screw 22 and the stem 38 carried thereby. This upward movement causes relative movement between the pin 39 on the stem 38 and the slot 37 of the hollow post 36, thus causing the stem 38 to turn relatively to the dial on the hand wheel, and causing the pointer 43 to move progressively across the sector designated "Silk" and thence successively across the sectors designated "Wool" and "Linen", to the sector designated "Cotton". If wool or linen is the material, tightening of the screw 22 is stopped when the pointer reaches the beginning of the "Wool" sector, or the beginning of the "Linen" sector, as the case may be.

With the device so set, as for instance at the beginning of the "Linen" sector, linen fabric may be passed between the rollers 10 and 11. Obviously the entry of such material will separate the rolls and exert a greater pressure on the spring, or indicating mechanism, causing the indicator hand 43 to swing into the sector; but ordinarily so long as the thickness of the material is not great enough to cause this indicator to swing entirely across and beyond the sector the pressure thus exerted will be satisfactory; should, however, the thickness of the material cause undue pressure the hand wheel should be turned counter clock-wise to reduce the pressure until the indicator hand is again within the sector and the wringing operation continued. Similar adjustment obviously may be made for any of the other materials.

It will be obvious that changes may be made in the details of construction without departing from the spirit of my invention and it is to be understood that I do not limit myself to the details there shown except as such details may be set out in any claim or claims.

I claim:

1. In a clothes wringer having a frame, a roller fixedly journalled in said frame, a second roller journalled in bearings movably mounted in said frame, a cross member having its ends contacting said movable bearings and adapted to urge said rollers together, and an arch member carried by said frame; means for adjusting and indicating pressure on said cross member, including a hollow screw passing through said arch member and having threaded engagement therewith, said screw having a hand wheel for accomplishing adjustment thereof; a post carried by said cross member and extending into telescopic relation with said screw, means for restraining relative rotary movement of said screw and said post, a compression spring interposed between said screw and said post, an indicia dial carried by said hand wheel, a pointer mounted for cooperation with said dial, and restrained from axial movement relative to said dial, and means interposed between said post and pointer for actuating said pointer, on relative telescopic movement of said post and pointer mounting means.

2. In a clothes wringer having a frame, a roller journalled in fixed bearings in said frame, a second roller journalled in bearings movably mounted in said frame, a cross member having its ends contacting said movable bearings and adapted to urge said rollers together, and an arch member carried by said frame; means for adjusting and indicating pressure on said cross member, including a hollow screw passing through said arch member and having threaded engagement therewith, a hand wheel for accomplishing adjustment of said screw; a post carried by said cross member and extending into telescopic relation with said screw, means for restraining relative rotary movement of said screw and said post, a compression spring interposed between said screw and said post, an indicia dial carried by said hand wheel, a pointer, means mounting said pointer for cooperation with said dial, and means interposed between said post and said mounting means for rotating said pointer, on relative telescopic movement of said post and pointer mounting means.

3. In a clothes wringer having a frame, a pair of relatively approachable rollers and a cross member for urging said rollers together, a hand wheel, a hollow screw carried thereby and threadedly engaging said frame, a post rotatably carried by said cross member and telescopically engaging said screw, said post having a helical slot therein, means compelling said screw and post to turn together, a compression spring interposed between said post and said screw, an indicating dial carried by said hand wheel, co-operative indicating means, means mounting said indicating means for cooperation with said dial and means secured to said mounting means and extending therefrom into sliding engagement with said helical slot.

4. In a clothes wringer having a frame, a pair of relatively approachable rollers and a crossmember for urging said rollers together, a hand wheel, a hollow screw carried thereby and threadedly engaging said frame, a hollow post rotatably carried by said cross member and telescopically engaging said screw, said post having a helical slot therein, means compelling said screw and post to turn together, a compression spring interposed between said post and said screw, indicating means carried by said hand wheel, a stem journalled in said wheel restrained from relative axial movement, and depending therefrom into telescopic engagement with said post, a pin projecting laterally from said stem into said helical slot, and a pointer mounted on said stem in co-operative proximity to said indicating means.

5. In a clothes wringer having a frame and employing a pair of rollers and a cross member for applying pressure to said rollers, means for adjusting and indicating spring pressures on said cross member, including a hand wheel having a central web, a hollow screw extending from said web, and threadedly passing through said frame, a hollow post abutting against said spring and extending telescopically within said screw, means for restraining relative rotary movement of said screw and said post, a compression spring within said screw and abutting said screw and said post to transfer thrusts therebetween, indicating means carried by said web, a stem centrally journalled in said web and restrained from relative axial movement, and a pointer mounted on said stem and turnable thereby, said post having a helical groove therein, said stem extending into said post, and carrying means slidably engaging said groove.

6. In a clothes whinger having a frame, a pair of relatively approachable rollers and a cross member for urging said rollers together, a member carried by said frame and manually adjustable toward or away from said cross member, interposed resilient means for transferring thrust from said adjustable member to said cross member, rigid, rotatably mounted means, carried by said member and restrained against axial movement relative thereto, said rigid means extending from said member toward said cross member, rigid means, non-rotatable relative to said member, carried by said cross member and extending therefrom into co-operative relation with said rotatably mounted means, means carried by one of said rigid means and co-operative with the other thereof to establish rotation of said member carried means, on relative longitudinal movement of the two said rigid means, and co-operative indicating means, carried respectively by said member and said rotatable means.

7. In a clothes wringer having a frame, a pair of relatively approachable rollers and a cross member for urging said rollers together, a member carried by said frame and manually adjustable toward or away from said cross member, interposed resilient means for transferring thrust from said adjustable member to said cross member, a stem, rotatably carried by said member and restrained from axial movement relative thereto, said stem extending toward said cross member, a post, non-rotatable relative to said member, carried by said cross member and extending therefrom into co-operative telescopic relation with said rotatably mounted stem, interacting means carried by said stem and said post, co-operative to establish rotation of said stem on relative longitudinal movement of said stem and post and co-operative indicating means carried respectively by said member and said stem.

8. In a clothes wringer having a frame, a pair of relatively approachable rollers and a cross member for urging said rollers together, a member carried by said frame and manually adjustable toward or away from said cross member, interposed resilient means for transferring thrust from said adjustable member to said cross member, rigid rotatably mounted means carried by said member, and restrained from axial movement relative thereto, said rigid means extending from said member toward said cross member; rigid means non-rotatable relative to said member carried by said cross member and extending therefrom into co-operative relation with said rotatably mounted means, means carried by one of said rigid means and co-operative with the other thereof to establish rotation of said member carried means on relative longitudinal movement of the two said rigid means, indicating means carried by said member and co-operative indicating means carried by said rotatable means, both said indicating means being positioned at right angles to the axis of said rotatable means.

9. In a clothes wringer having relatively approachable rollers, a cross member for applying wringing pressure thereto, and a frame having a threaded opening therethrough; means for applying and indicating pressure applied, comprising a self-contained unit, adapted to extend through said opening into engagement with said member, said unit including a screw threaded for engagement with said opening, a hand wheel secured on the outer end of said screw, a relatively non-rotatable pressure delivering member extensibly carried by the opposite end of said screw and an interposed pressure spring; said wheel carrying an indicating dial at right angles to the axis of said screw, a complementary indicating pointer mounted to swing about the axis of said screw, and means for rotating said indicating pointer on movement of said pressure transmitting means.

10. In a clothes wringer having relatively approachable rollers, pressure applying means, relatively non-rotatable pressure transmitting means and an interposed pressure spring; said pressure applying means, including a hand-wheel, carrying a concentric indicating dial and a coaxial relatively rotatable indicating pointer; and means for actuatably coupling said pointer and said pressure delivering means.

EDWIN S. COOK.